United States Patent [19]

Smith et al.

[11] Patent Number: 4,503,837
[45] Date of Patent: Mar. 12, 1985

[54] BAKING OVEN

[76] Inventors: Gilbert L. Smith, 3011 Ravine Way, Green Bay, Wis. 54301; David L. Swanson, 6718 Revere Ave., Wauwatosa, Wis. 53213; Gilbert Trick, 888 St. Charles Dr., Green Bay, Wis. 54302

[21] Appl. No.: 569,284

[22] Filed: Jan. 9, 1984

[51] Int. Cl.³ .............................................. F23M 7/00
[52] U.S. Cl. ...................................... 126/190; 49/125
[58] Field of Search ........................ 126/200, 190, 198; 49/125

[56] References Cited

U.S. PATENT DOCUMENTS 2,196,591 4/1940 Kramer ................................ 49/125
4,192,100 3/1980 Klema .................................. 49/125

Primary Examiner—Carroll B. Dority, Jr.
Attorney, Agent, or Firm—Recka & Joannes

[57] ABSTRACT

Commercial baking oven with sliding doors; the doors are mounted closely parallel by cylindrical shoes of low friction material fitted to the door bottoms, the shoes slide in a plurality of equidistant bottom vee tracks, the upper part of the doors being located by guide shoes of a low friction material operating in an upper track; heat retaining lips mounted on door edges abut when the doors are closed; a heat retaining zee strip is mounted between the cylindrical shoes; the vee track is shorter than the fully closed measurement of the doors so debris is forced out of the vee track as doors are open and closed.

4 Claims, 11 Drawing Figures

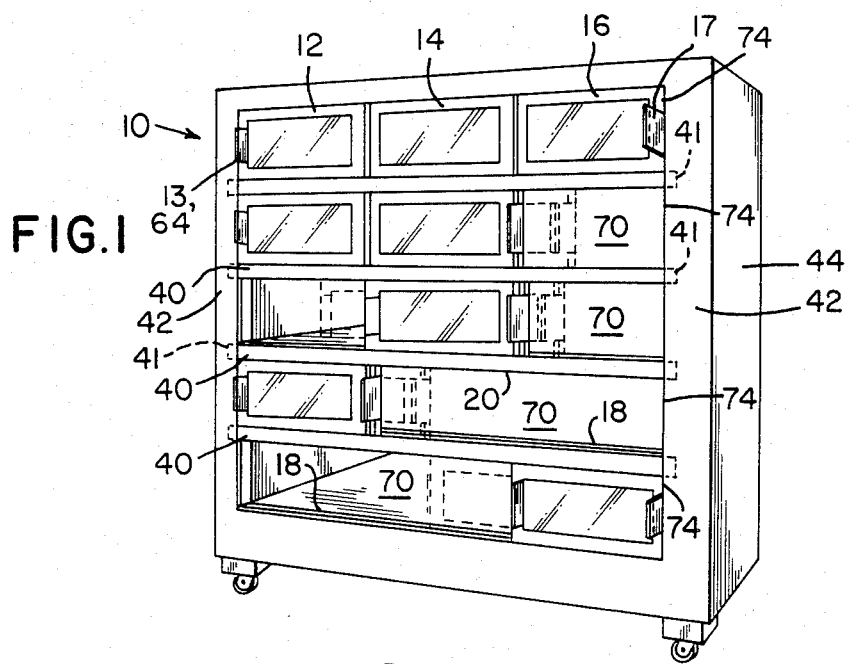
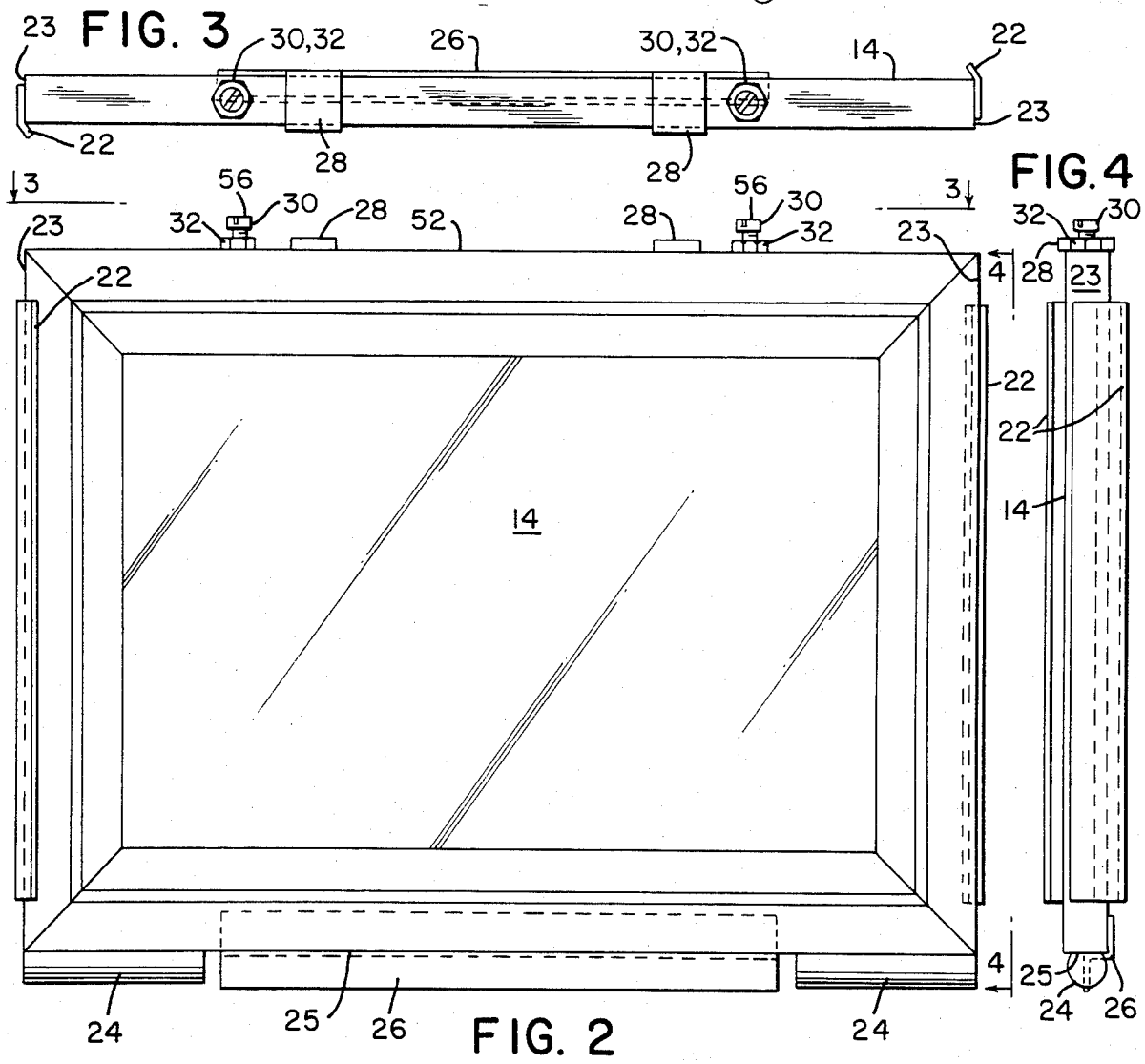

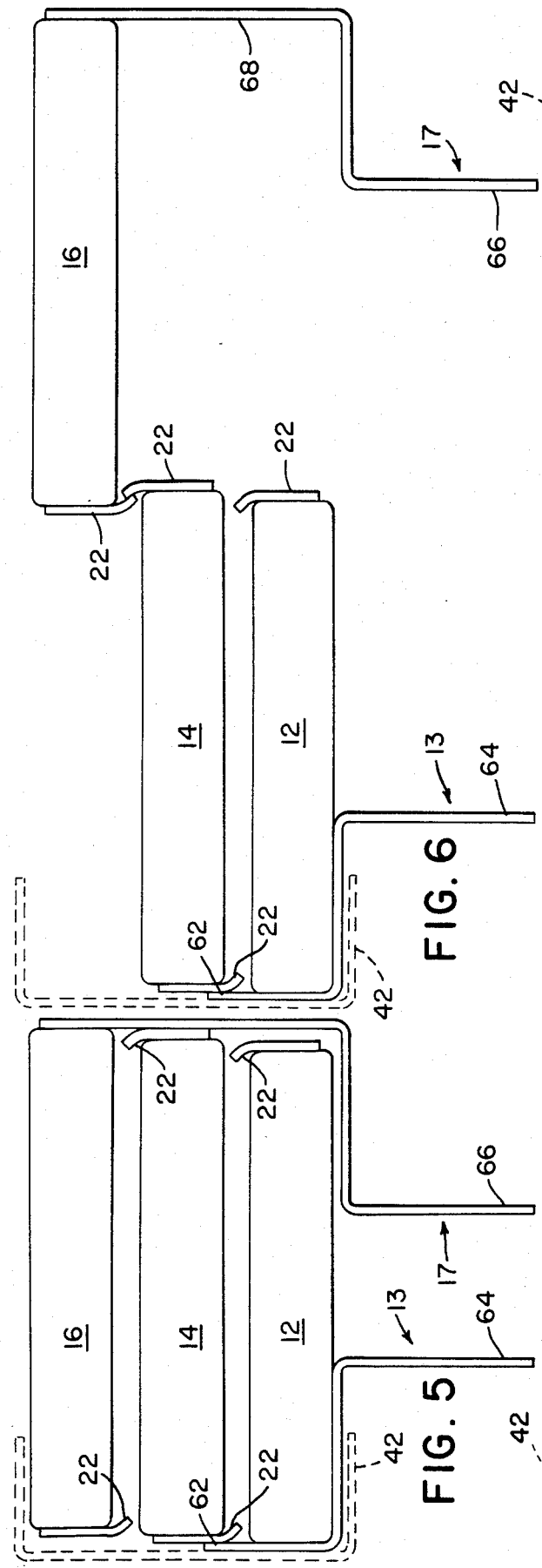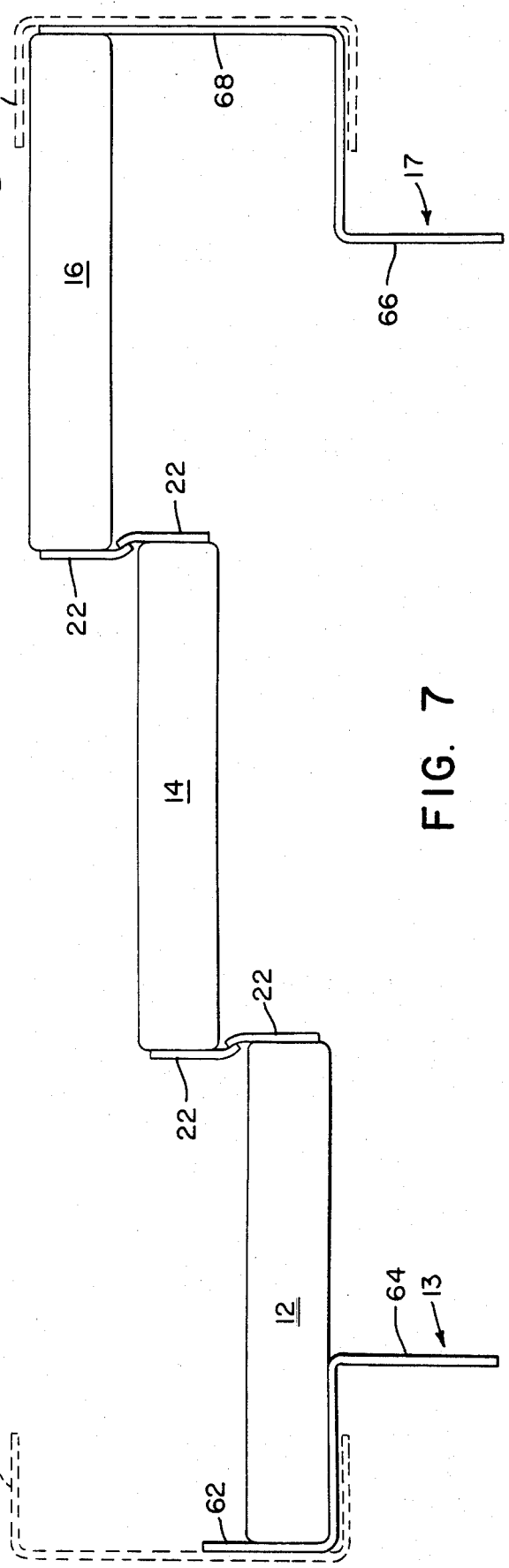

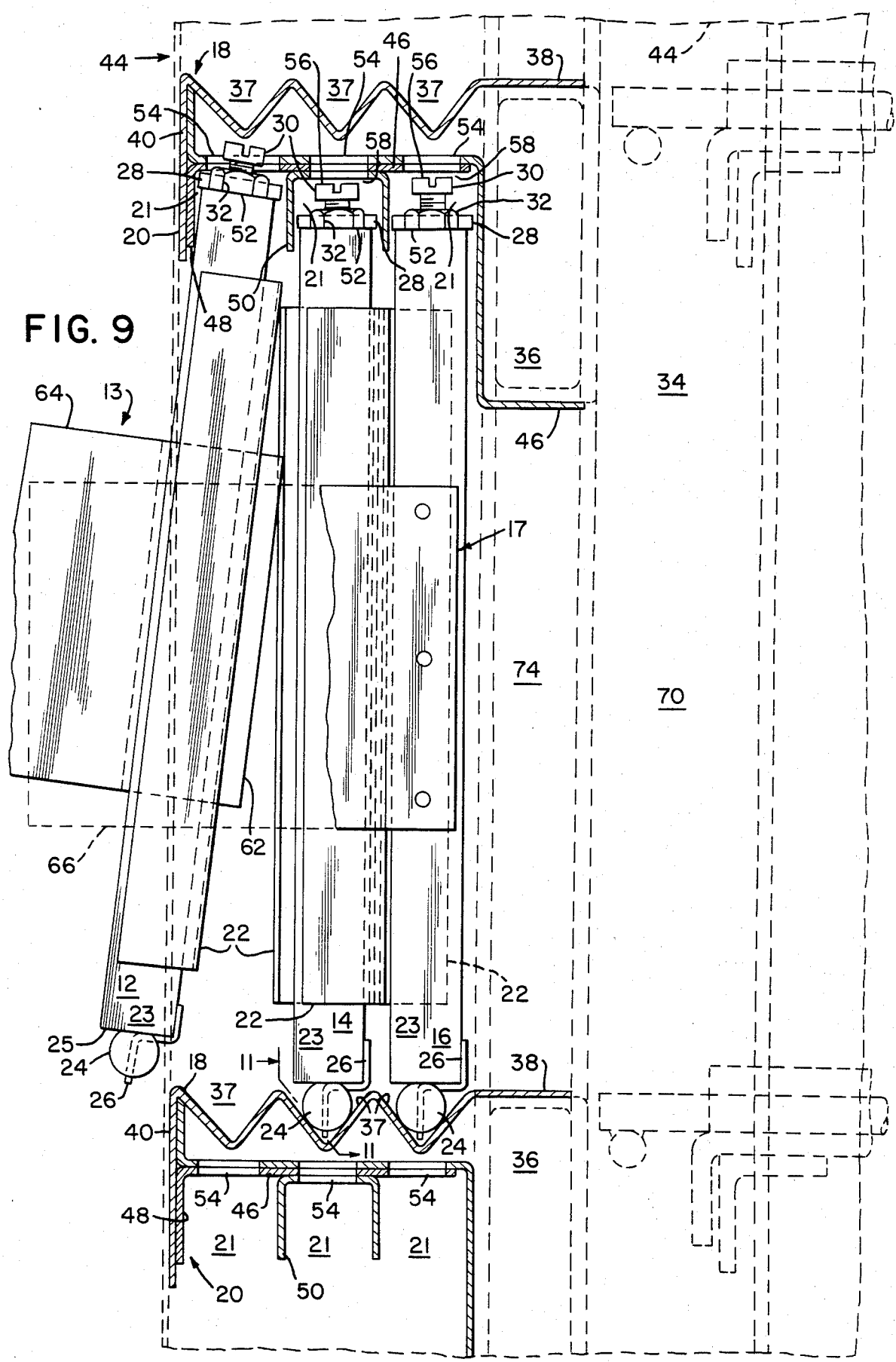

BAKING OVEN

BACKGROUND OF THE INVENTION

1. Field of the Invention

The invention pertains to commercial baking ovens of the type used in bakeries, restaurants and supermarkets for baking bread and the like.

2. Description of the Prior Art

A commercial baking oven is an insulated cabinet having a plurality of vertically disposed baking compartments separated from one another by decks. Access to the baking compartments is usually through a plurality of glass paneled doors.

In prior art ovens the doors have been hinged at the bottom of a particular compartment, to open outwardly, hinged at the top to open up or hinged at the side. All such oven doors swing outwardly and impinge into the aisle space in front of the oven.

Doors hinged at the top or bottom require that the baker reach over the hot door to insert or remove trays of items to be baked. Mounting a plurality of doors at each baking compartment, so trays of less width than the compartment can be inserted, creates sealing problems on door edge to door edge seals.

Doors hinged at the side eliminate the need to reach over hot doors to insert baking trays. However, such doors require hinges and extend outwardly into an aisle farther than does a top or bottom hinged door.

Some ovens use doors that are analogous to the door on a roll top desk. This door design creates its own problems with heat warping and in requiring ovens to be taller or to have fewer cooking decks for a given height of oven in order to provide storage space for the doors.

Hinged and deck mounted doors as described are hard to keep clean and free of baking debris. The hinges cannot be easily removed for cleaning. Such hinges also require maintenance.

BRIEF SUMMARY OF INVENTION

The invention is a sliding door baking oven, using heat retaining members to provide a seal adequate for baking, yet allowing free movement of the heated doors. Heat loss and design modifications to deal with heat warping are balanced to provide an improved door. Sliding baking oven doors, mounted so as to be self centering, and self cleaning, are provided to close a baking compartment without use of plastic or flexible interdoor seals.

The doors allow partial opening of a baking compartment to allow inserting trays of items to be baked without the heat loss incident to opening the whole baking compartment.

The invention is a system of sliding access doors, mounted on low friction runners or shoes, for use in commercial multi deck baking ovens, which is simple, sanitary, maintenance free and conserves oven heat, and which does not have articulating parts or wearable flexible wipes or heat seals between the doors. The doors also clean the tracks in which they operate. It is an object of the invention to provide oven doors which in their opening and closing do not encroach on the oven interior, on the baker's workspace or into the aisle in front of the oven. It is an object of the invention to conserve oven heat by allowing a baking compartment to be opened just enough to admit baking trays of varying widths. It is an object of the invention to provide doors which clear their own tracks of bakery spills and debris, the doors being easily removable for cleaning.

BRIEF DESCRIPTION OF DRAWINGS

Various objects and advantages will appear from the following detailed description of the invention with reference to the drawings in which:

FIG. 1 A typical multi-deck, commercial baking oven with parallel sliding doors showing the varied openings provided to the baking compartment for the insertion or removal of trays of bakery products;

FIG. 2 Front view of the center door of a three door, per baking compartment, oven.

FIG. 3 A view taken on line 3—3 of FIG. 2;

FIG. 4 A view taken on line 4—4 of FIG. 2;

FIG. 5 A schematic view of the three doors of a three-door per baking compartment oven, opened to effect a two-thirds opening to the baking compartment;

FIG. 6 A schematic view of the doors of a three-door per baking compartment oven opened to effect a one-third opening to the baking compartment;

FIG. 7 A schematic view of the three doors of a three-door per baking compartment oven at full closure of the opening to the baking compartment;

FIG. 9 A section taken along 9—9 of FIG. 8;

Figure 8:
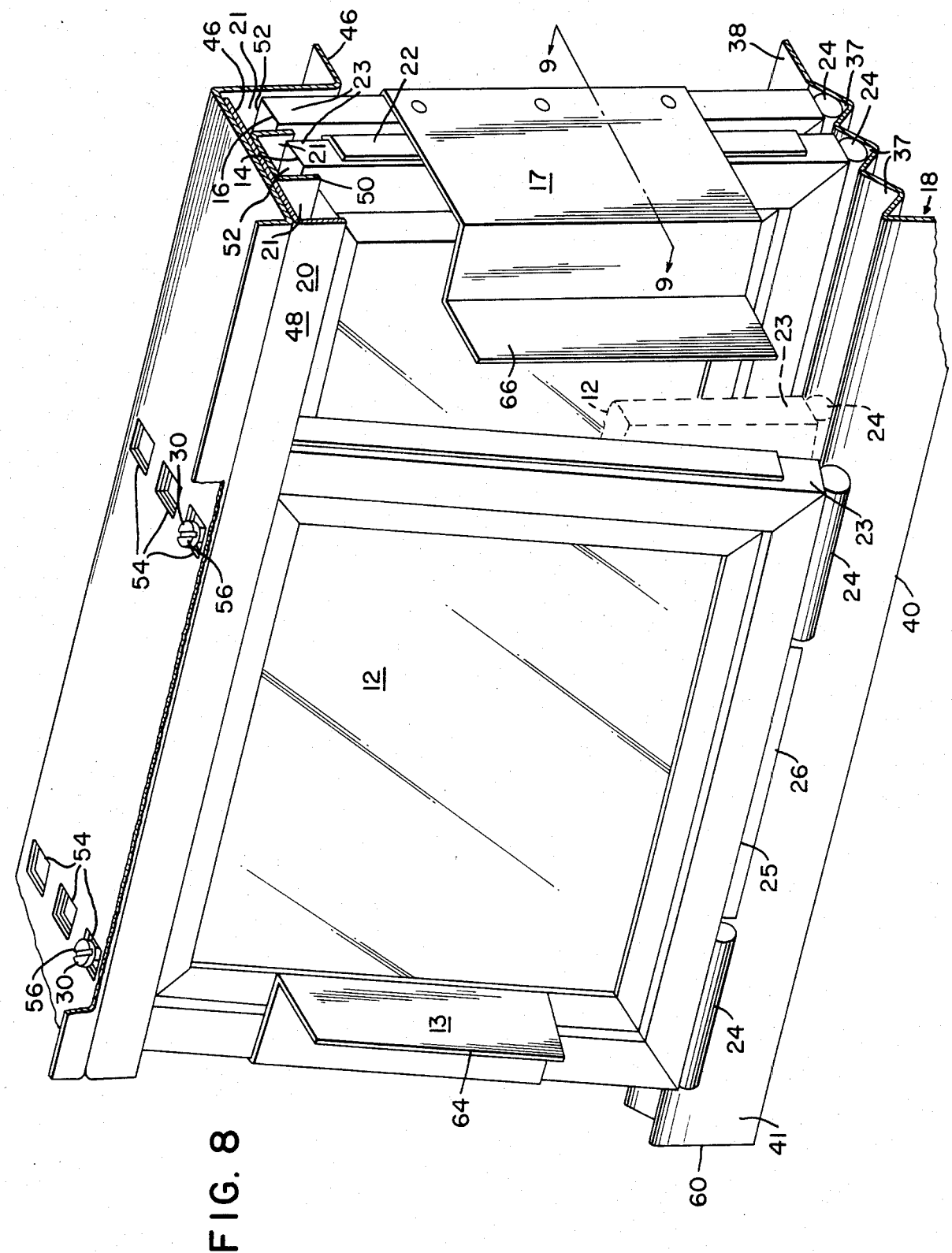
FIG. 8 A perspective view, in partial section, showing the doors of a three door per baking compartment oven; the left door is shown being lifted up and out at the door removal points.

The Elements of the Invention are:

10 A typical multi-deck, three door per baking compartment commercial bakery oven also shown as FIG. 1;
12 Left door as would appear to a baker facing the oven;
13 Left door hand grip;
14 Center door;
16 Right door;
17 Right door hand grip;
18 Triple door lower guide vee track;
20 Triple door upper guide track;
21 Door running space;
22 Door coupling and heat retaining members;
23 Vertical edges of doors;
24 Door-carrying shoes or runners;
25 Bottom edge of doors;
26 Zee shaped air baffles;
28 Door-guiding shoes;
30 Safety screws;
32 Safety screw locknuts;
34 Main frame;
36 Frame struts;
37 Vee tracks in lower track 18;
38 Horizontal part of lower track 18;
40 Vertical part of lower track 18;
41 End of 40;
42 Oven housing Stanchions;
44 Oven housing;
46 Horizontal portion of upper guide track 20;
48 Vertical portion of upper guide track 20;
50 U-shape portion of upper guide track 20;
52 Top edge of doors;
54 Door removal holes in upper guide track 20;

56 Upper surface of safety screw 30;
58 Clearance between safety screws 30 and upper guide track 20;
60 End faces of vee track 37;
62 Inwardly extending lip of left door hand grip 13;
64 Outwardly extending lip of left door hand grip 13;
66 Outwardly extending lip of right door hand grip 16;
68 Door butting portion of right door hand grip 16;
70 Baking compartment;
72 Baking goods fragments; and
74 Oven access openings.

DESCRIPTION OF PREFERRED EMBODIMENT

Referring to the drawings, FIG. 1 shows a typical multi deck baking oven, FIG. 8 shows the guide tracks, in this case mutually supporting lower, door carrying tracks 18 and upper door guiding track 20 which are affixed to frame struts 36 of main frame 34 of oven 10. The attachment is best shown in FIG. 9.

Lower track 18 is made of light guage, sanitary material, in the preferred mode being made of stainless steel, such track 18 again in the preferred mode is formed to include:

(1) three vee-shaped tracks 37, to accomodate door-carrying shoes 24 of doors 12, 14 and 16;

(2) horizontal part 38 which overlies strut 36 of main frame 34 for fastening to strut 36; and (3) a vertical part 40 which is a stiffener for upper guide track 20 and is an aesthetically pleasing frontal piece for the exterior of the oven. Part 40 is affixed at its two ends 41 to the vertical stanchions 42 of oven housing 44.

Upper guide track 20 is likewise made of light guage, sanitary material such as stainless steel as in the preferred mode; and is an assembly of three pieces, so as to provide (1) a horizontal part 46 to underlie strut 36 of main frame 34 for the fastening thereto;

(2) a vertical part 48 to be fastened to and to provide stiffening for lower track 18; and (3) a "u"-shaped section 50 to accomodate and to guide center door 14.

The oven can be provided with any number of sliding doors. Three doors appears to petitioner to be the best mode. A larger number requires deeper runs of track, which impinge on the baking area or require a deeper oven. With three doors the compartment can be opened two thirds of its width for insertion of wider trays. A two door per deck oven can only be opened to a maximum of half the width of the compartment.

As can be best seen from drawing FIGS. 2 and 9 low friction, door-carrying shoes or runners 24 are affixed to the bottom edges 25 of the doors; shoes 24 are cylindrical to provide self centering of the shoes and their respective doors in the vee tracks 37 of lower guide track 18. Shoes 24 are approximately two inches long, the length is not critical; however, if much longer, the oven heat warps the shoes and adversely affects the fit, alignment and spacing of doors 12, 14 and 16. Between the shoes 24, zee-shaped air baffles 26 are affixed to the bottom edge 25 of doors 12, 14 and 16 so as to limit loss of oven heat. Fit, alignment and spacing of the doors with respect to each other is important to uniform baking. The space between adjacent doors is held to a uniform distance from the top to the bottom of the doors.

Door-guiding shoes 28 are affixed to the top edges 52, of doors 12, 14, 16. These shoes are wider than the doors and are just slightly narrower than the door running space 21 provided for doors' movements in track 20. The guide shoes 28 are made of "Teflon". This material is used to provide non-sticking sliding doors, while allowing for thermal expansion. Shoes 24 in the preferred embodiment are also made of "Teflon", the shoes however can be made of any heat resistant low friction material such as solid "Nylon". Coupling members 22 are affixed to the vertical edges 23 of all doors, as best shown in FIGS. 5, 6, and 7 in which is shown how the three doors 12, 14 and 16 are coupled to provide variable opening, from zero to two-thirds open, of the baking compartment. Left door hand grip 13 and right door handgrip 17 are provided for door manipulation from right to left or from left to right.

Door coupling and heat retaining members 22 limit loss of oven heat as well as provide the mechanism by which varied widths of opening into the baking compartment are provided by moving either hand grip 13 or 17.

Left door hand grip 13 has mounted thereon outward extending lip 64 and has inward extending lip 62.

The first door coupling and heat seal 22 mates with the opposing heat seal on the second door.

Mating of the heat seals of the three doors is facilitated by the three doors generally being parallel from top to bottom, the degree of approach to parallel of the doors being facilitated by the cylinder in vee mounting of the bottom of the doors and the closely fitted guide shoes 28.

The couplings themselves are bent outward so each coupling overlaps with its opposite coupling. Because the doors are close to parallel because of the vee and cylinder mounting the couplings tend to mate closely across their mating faces.

The handle on right door 17 is quite deep, deep enough to span the two other doors; as the right door 16 is moved to the left, the flat of handle 17 picks up the middle door and carries it to the left, when the door travel is reversed, the heat seal coupler of the right door and the middle door engage, pulling the middle door back.

The doors can be installed or removed only when located at one point. This prevents accidental removing of the doors while they are being manipulated.

Best seen in FIGS. 8 & 9, left door 12 is seen located at that point being installed. In this area only, holes 54 are provided in the horizontal portion 46 of upper guide track 20, the holes are the same distance apart as are the safety screws 30 on the upper edges 52 of all doors; thus when safety screws 30 are brought into alignment with door removal holes 54, any door may be lifted clear of its lower track 18, then swung outwardly and removed as best seen in FIGS. 8 & 9. In any other position the doors cannot be accidently dislodged, being so prevented by means of safety screws 30 which are so adjusted in height as to provide only a minimum of clearance 58 between their upper surface 56 and the horizontal portion 46 of guide track 20. Jam nuts 32 lock safety screws 30 in their set position.

Figure 11:
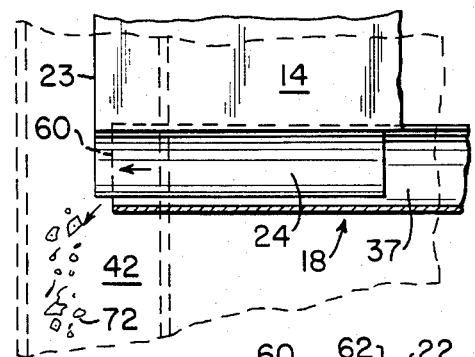
FIG. 11 Section take on line 11—11 of FIG. 9 showing bakery goods fragments being pushed down the hollow frame stanchion.
Figure 10:
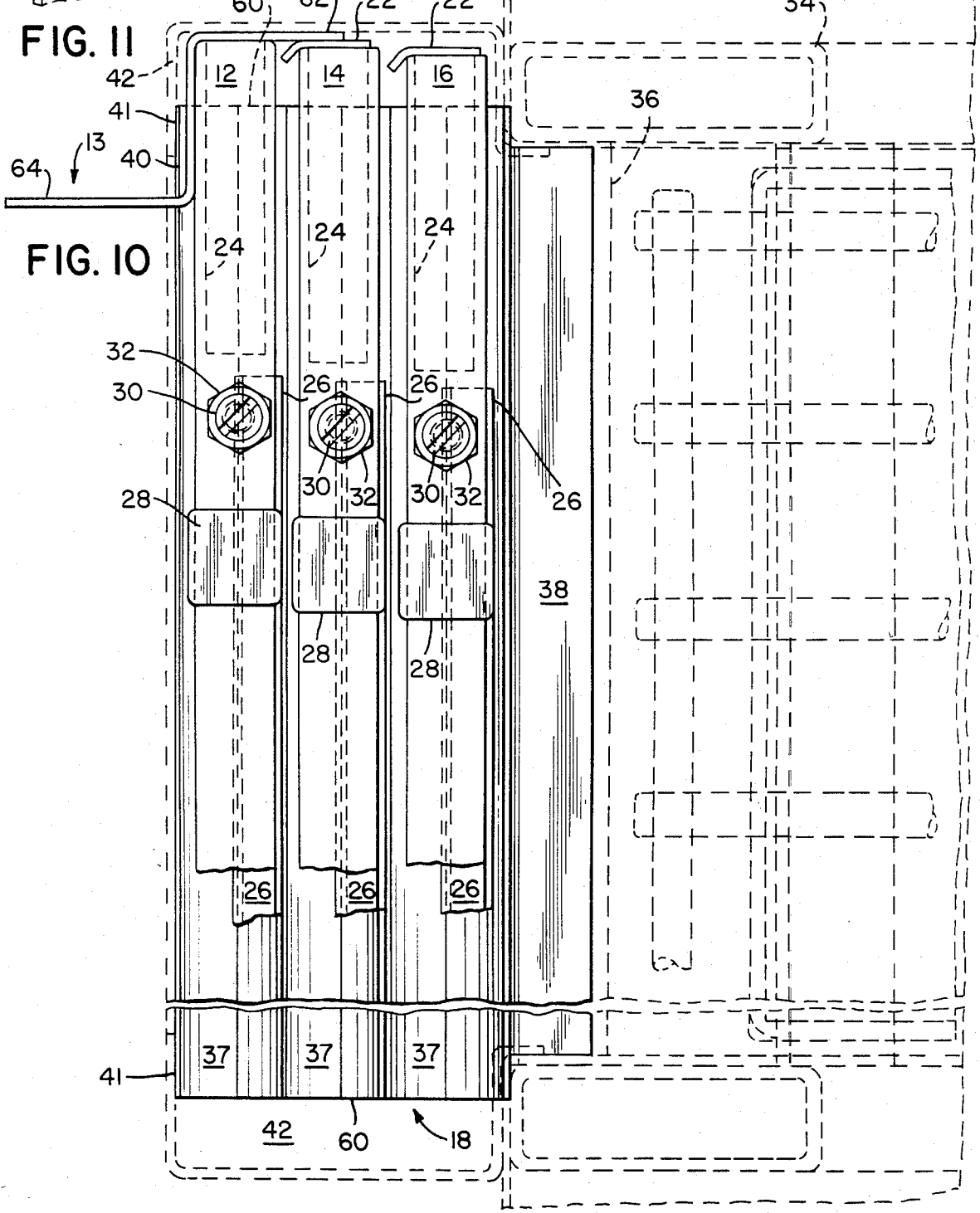
FIG. 10 A fragmentary plan view showing all doors moved fully to the left.

Best seen in FIG. 11 door carrying shoes 28 overrun the end faces 60 of their respective vee tracks 37 as they approach the limit of their movement into oven frame hollow stanchions 42, so plowing away and spilling down the hollow stanchion 42, in a self cleaning action such fragments 72 of bakery goods as fall into the vee track 37.

I claim:

1. A commercial baking oven of the type in which a plurality of vertically disposed baking compartments, mounted between stanchions, are encased in an insulated cabinet, each baking compartment including top, bottom and back walls and a front wall having a front access opening and a door for closing such access opening wherein the improvement comprises:

lower guide track mounted immediately within the front access opening, between the oven stanchions, at the bottom of such access opening; such guide track being formed in the shape of a plurality of generally equidistant parallel vees;

upper guide track mounted within the front access opening, between the oven stanchions, at the top of such access opening;

a plurality of parallel sliding doors mounted within the upper guide track and lower guide track so as to open and close the access opening to the baking compartment, when slid from side to side, such doors having a top edge and a bottom edge;

door carrying runners mounted on the bottom of such doors, such runners being in the shape of cylinders of low friction material, such cylinders being mounted so the long axis of the cylinder is parallel to a line passing through the vee track, the cylinders supporting the doors riding in the track;

door guide shoes mounted on the top edge of such doors, such shoes being wider than the doors and slightly narrower than the door running space in the upper track; such guide shoes, and cylinder and vee mounting of the bottoms of the doors maintaining a generally uniform distance between the parallel doors measured across a plane passing between opposing doors and parallel to them.

2. The invention described in claim 1 including baking compartment heat retaining means comprising:

zee shaped air baffles mounted on the bottom of the doors within the area defined by the ends of the door carrying runners;

door heat retaining members mounted at the vertical edges of the doors.

3. The invention described in claim 1 including door removal means comprising:

an upper guide track having door removal holes formed therein;

a pair of safety screws mounted on the top of the doors, such safety screws being spaced apart the same distance as are the door removal holes in the upper guide track.

4. The invention described in claim 1 wherein:

the lower guide track extends within the stanchions of the oven, such track being shorter than the combined width of the fully closed sliding doors, so the door carrying runners extend past the end of the track while still partially supported thereby, in operation forcing debris along and out of the track into the stanchions.

* * * * *